Aug. 6, 1929.   I. G. WILSON   1,723,108
ECHO MEASURING CIRCUIT
Filed March 26, 1927
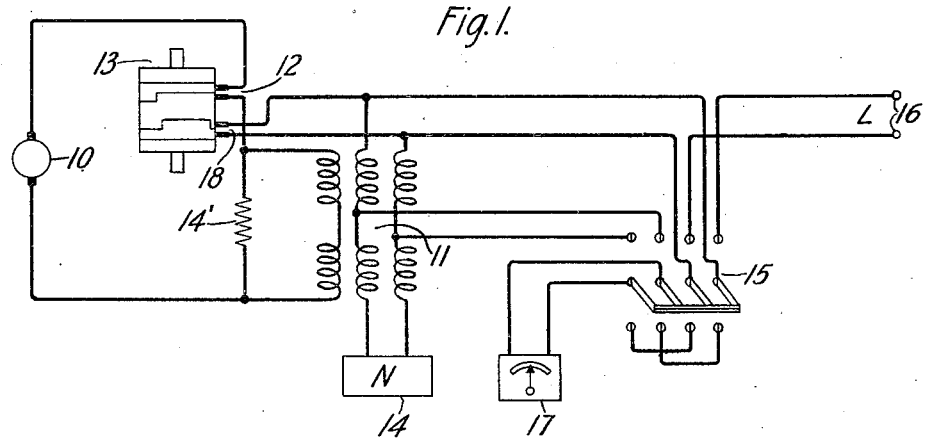
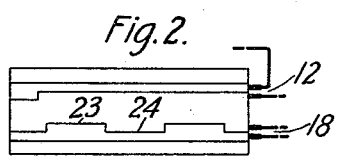
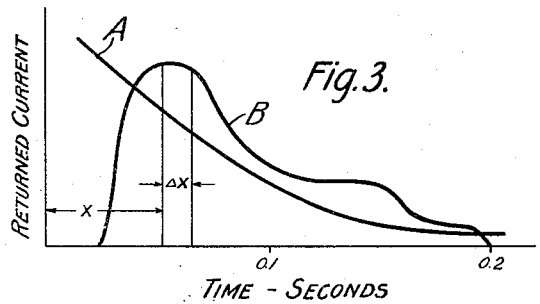
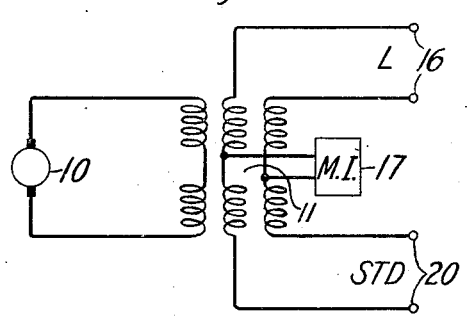
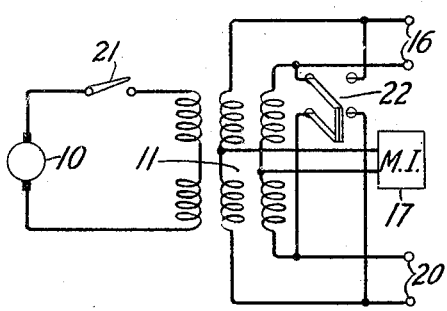
Inventor:
Ira G. Wilson
by E. V. Griggs
Attorney Patented Aug. 6, 1929.

1,723,108

UNITED STATES PATENT OFFICE.

IRA G. WILSON, OF BROOKLYN, NEW YORK, ASSIGNOR TO WESTERN ELECTRIC COMPANY, INCORPORATED, OF NEW YORK, N. Y., A CORPORATION OF NEW YORK.

ECHO-MEASURING CIRCUIT.

Application filed March 26, 1927. Serial No. 178,804.

This invention relates to the measurement of echo effects and has for an object to provide a simple and accurate method for measuring echo effects.

In a transmission system, particularly one employing separate one-way amplifiers for repeating in the two directions, irregularities and unbalances in the circuit are likely to cause reflections. If the system is so long that the time of transmission is appreciable and the losses are not so great as to cause the reflected energy to become inappreciably small before it reaches the ear of the listener, echo effects will be experienced. Such echoes may be produced at a number of reflection points and are not only set up by the main wave but also by reflected or echo waves so that one impulse will set up a succession of echoes.

As described by A. B. Clark in Transmission over long cable circuits published in "Transactions of the American Institute of Electrical Engineers", Vol. XLII, page 86, tests have been made indicating the approximate magnitude at various times after a wave is impressed on the system which the resulting echoes can have without materially impairing the quality of transmission. It is, therefore, desirable to obtain a measurement of the magnitude of the echoes with relation to time in order to properly design and maintain any system.

In a preferred embodiment, this invention comprises a source of waves and a measuring instrument associated through a balanced, or bridge, circuit with the system to be measured so that the measuring instrument indicates only the echoes from the system and not the wave impressed thereon. A switching mechanism is arranged so that the echoes from the system will affect the measuring instrument only during a definite interval definitely timed with respect to an impressed impulse. By making a series of such measurements during similar intervals differently timed with respect to the impressed wave a good indication of the relation of the magnitude of the echoes with respect to time may be obtained.

In a modified form of the invention a measurement of the echoes is obtained by comparing them with the echoes from a system of known characteristics. The comparison is made by the use of a bridge for obtaining a null effect between the echoes from the two systems. A switching arrangement similar to that employed in the embodiment first described may be used for facilitating the measurements.

The invention is illustrated in the accompanying drawing in which

Fig. 1 shows diagrammatically a preferred embodiment of the invention;

Fig. 2 shows a development of the surface of the cylindrical switching mechanism employed in the circuit of Fig. 1;

Fig. 3 shows graphically the relation of the magnitude of the echoes and time; and Figs. 4 and 5 show embodiments of the invention in which the echo effects of the system under test are compared with those of a system of known characteristics.

Referring to Fig. 1, there is shown a measuring circuit comprising a source of direct current 10 connected to a hybrid coil or balanced transformer 11 through one set of contacts 12 of a switching device 13. A resistance 14' is connected in shunt to this circuit to maintain the hybrid coil balance when the contacts 12 are open. A network 14, designed to balance the impedance of the line or system under test, is connected in one series arm of the hybrid coil 11. A switch 15 is arranged so that when it is closed in the upper position the other series arm of the hybrid coil is connected to the terminals 16, to which the line under test is connected, and the shunt arm is connected to a measuring instrument 17 of the integrating type, preferably a ballistic galvanometer. Under these conditions a pulse or wave from the source 10 is divided between the line under test and the network 14 without having any effect on the measuring instrument 17. The other set of contacts 18 of the switching device 13 is arranged to open and short circuit the terminals 16. When the switch 15 is closed in the lower position waves from the source 10 are impressed directly upon the measuring instrument.

Fig. 2 shows a development of the surface of the switching device 13. As shown, the switching mechanism is designed so that the contacts 12 are closed for a short interval to impress an impulse on the line under test, which is connected to the terminals 16, the contacts 18 remaining open during this interval. Thereafter the contacts 18 are closed for an interval of time represented by the space 23 to prevent echoes from the line under test from being impressed on the measuring circuit, after which the contacts 18 are opened for a second interval, represented by the space 24 during which the echoes may be measured, and the contacts are again closed.

The operation of the circuit is as follows: With the switch 15 closed in its upper position, the switching mechanism 13 is operated to close the contacts 12 and impress a pulse or wave of short duration upon the line under test. This wave divides between the line and the network 14 without affecting the measuring instrument 17. At the end of the pulse the switching mechanism operates to close the contacts 18, for a time during which no echo waves can be impressed on the measuring instrument. The contacts are then opened for a definite interval after which they are again closed. During the interval the contacts 18 are open, the echo or reflected waves will come back to the hybrid coil 11 and divide between the series and shunt arms, the balance being maintained by the resistance 14'. The portion of the echoes flowing to the series arm is dissipated in the network 14 and the part flowing to the shunt arm effects the measuring instrument 17 to give an indication of the amplitude of the echo waves returning during that interval. The length of time that the line is short circuited is then changed by varying the speed of rotation of the drum 13 or the length of the contact space 23 and a second measurement of the magnitude of the echo waves during a similar interval differently spaced with respect to the impressed wave is made. By making a series of such measurements a good indication of the relationship of echo effects with respect to time is obtained.

In order to determine the relationship of the magnitudes of the energy sent out and that reflected, the switch 15 is closed in its lower position in which case the waves from the source 10 are impressed directly upon the measuring instrument 17.

Fig. 3 shows curves representing the relation of the amplitude of the returned current to time after the pulse is impressed on the system. Curve A shows approximately the relationship of maximum echo (or returned) current to time which can be permitted without objectionably impairing the quality of transmission. Curve B shows, for a typical system, how the effects of the echoes vary with the time after the pulse is impressed on the system. This curve is obtained by the method of this invention above described by obtaining a series of readings for a number of intervals $\triangle X$ spaced at varying times X after the pulse is impressed on the system.

Fig. 4 shows a measuring circuit in which the echo or reflected waves from a system under test are compared with those from a system of known characteristics. In this circuit the source of waves 10 is connected to the hybrid coil or balanced transformer 11 in the same manner as in the circuit of Fig. 1. The line under test is connected to the terminals 16 of one series arm of the hybrid coil and a system of known echo or reflection characteristics is connected to the terminals 20 of the other series arm of the hybrid coil 11. A measuring instrument 17 is connected to the shunt arm of the hybrid coil 11 as in the circuit of Fig. 1. If the impedances of the circuits connected to the terminals 16 and 20 are balanced, the waves from the source 10 will divide between these circuits without affecting the measuring instrument 17. However, echo or reflected waves from the two circuits will give an indication in the instrument 17. When the constants of the system connected to the terminals 20 are adjusted so that the echoes therefrom nullify the echoes from the system connected to the terminal 16, in which case there will be no indication in the measuring instrument 17, the echo characteristics of both systems are alike.

Fig. 5 shows a modification of the circuit arrangement of Fig. 4 arranged to assist in the determination of individual echoes from a circuit which produces a large number of echoes. In this circuit a switch 21 is arranged to impress an impulse upon the circuits and a second switch 22 is arranged to alternately short circuit and open circuit the systems connected to the terminals 16 and 20. These switches are preferably controlled by a mechanism similar to that used in the circuit of Fig. 1 so that the echoes coming back during definite intervals may be measured.

This invention is not limited to the application described but may be used for various other purposes.

What is claimed is:

1. In combination with a transmission system, an integrating measuring instrument, means for impressing a pulse of energy on said system, means for preventing reflected waves produced in said system by said pulse from affecting said instrument for a definite time after said pulse is impressed on the system, means for permitting said reflected waves to affect the instrument during a definite time interval thereafter, and means thereafter operative for preventing said waves from affecting said instrument, all of said means being automatically operated with definite time intervals between operations.

2. A circuit for measuring echo effects comprising a bridge arrangement, means for connecting the circuit under test to one arm thereof, an electrical source connected to one set of terminals of said bridge for supplying waves thereto, a measuring instrument connected to an opposite set of terminals to determine the magnitude of the echo currents from the circuit under test, and automatic means for controlling the sequence of connecting said source and said instrument to said bridge terminals for definite time intervals.

3. A circuit for measuring echo effects comprising a bridge arrangement, means for connecting the system under test in one arm thereof, a network for balancing the impedance of said system connected in another arm, an electrical source, a switch for connecting said source to one set of terminals of the bridge for supplying waves thereto, a measuring circuit connected to the other set of terminals of said bridge to determine the magnitude of echo currents from said source, a second switch for short-circuiting the connections to the system under test, and means automatically controlling a predetermined time and sequence of operation of said switches.

4. In a circuit according to claim 3, means for simultaneously operating the switches to close the first switch for a short period to impress a pulse of energy upon the system under test then to successively close, open and again close the second switch for definite intervals while maintaining the first switch open.

5. The method of measuring echo effects in a transmission system which comprises simultaneously impressing a wave on said system and on a system of known echo characteristics and simultaneously comparing the waves reflected from said systems at different time intervals after a wave is impressed and discontinued thereon.

6. The method of determining the relation of the amplitude of reflected waves returned from a transmission system to their time or delay relative to an impressed wave which produces them, which comprises impressing a wave on the system under test, measuring the amplitude of the waves returned from the system during a definite interval knowingly spaced in time with respect to the impressed wave, and repeating the operation to obtain measurements of the waves returning during similar intervals differently spaced in time with respect to the impressed wave producing them.

7. The method of measuring the magnitude of the echo effects of a transmission system relative to their time or delay with respect to the wave producing them, which comprises impressing a wave on the system, preventing the return of waves from the system for a known time of the order of a fraction of a second, measuring the magnitude of the waves returning during a definite interval, and repeating the operation to obtain measurements of the waves returning during other similar intervals differently spaced in time with respect to the impressed wave.

8. A method of determining the echo characteristic of an electrical transmission circuit which comprises impressing upon said circuit for a certain period of time a wave of definite amplitude, measuring the amplitude of the returning portion of said wave at successive definite time intervals after said period of impression and utilizing said amplitude and time relations to secure a reflection characteristic of said line.

In witness whereof, I hereunto subscribe my name this 24th day of March A. D., 1927.

IRA G. WILSON.